Aug. 25, 1936.  C. B. PUTTASWAMY  2,051,892
DIRECTION INDICATOR
Filed Dec. 16, 1931   2 Sheets-Sheet 1

Chola B. Puttaswamy
INVENTOR
BY Victor J. Evans
and Co. ATTORNEY

Aug. 25, 1936.   C. B. PUTTASWAMY   2,051,892
DIRECTION INDICATOR
Filed Dec. 16, 1931   2 Sheets-Sheet 2
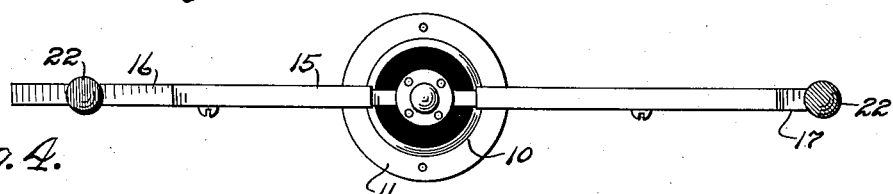
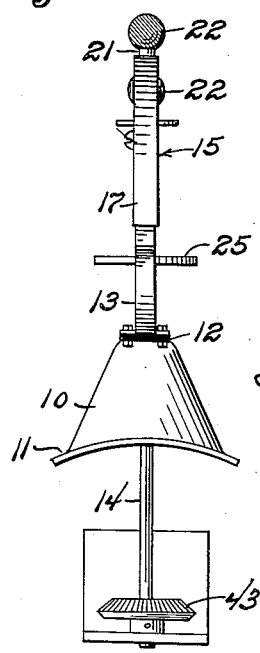
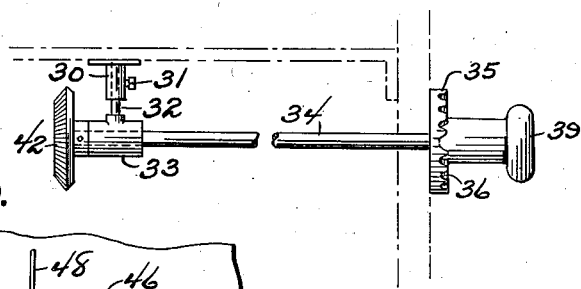
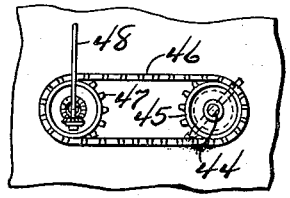
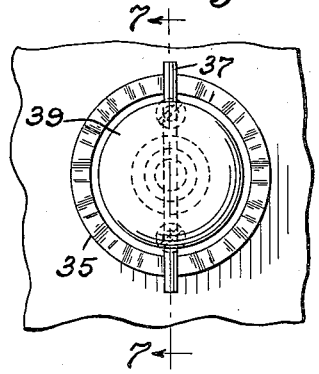
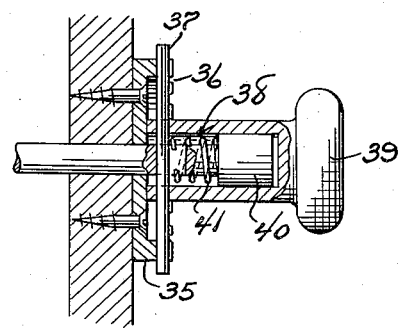
Chola B. Puttaswamy
INVENTOR
BY Victor J. Evans and Co.
ATTORNEY Patented Aug. 25, 1936

2,051,892

UNITED STATES PATENT OFFICE 2,051,892

DIRECTION INDICATOR

Chola B. Puttaswamy, Chellakere, India

Application December 16, 1931, Serial No. 581,424

1 Claim. (Cl. 177—329)

The invention relates to a direction indicator and more especially to a manually controlled visible direction indicator or signal.

The primary object of the invention is the provision of a device of this character wherein the operator of an automobile can operate the same so as to indicate the direction of movement of the motor driven vehicle at the time of the starting thereof or while the same is in motion, particularly with regard to right and left hand turns, the device being novel in form and is susceptible of adjustment with dispatch.

Another object of the invention is the provision of a device of this character wherein the indicator proper simulates an arrow, the ends thereof being capable of illumination through the use of electric bulbs or leads and when operated will indicate the direction of turns of the vehicle either right or left at the time of starting or during motion thereof so that oncoming traffic either from the rear or at the front thereof will have knowledge of the course of the vehicle.

A further object of the invention is the provision of a device of this character which is simple in construction, artistic in appearance, as the same is neat and attractive, thoroughly reliable and efficacious in its purpose, operable with dispatch, strong, durable, and inexpensive to manufacture and install.

With these and other objects in view, the invention consists in the features of construction, combination and arrangement of parts as will be hereinafter more fully described in detail, illustrated in the accompanying drawings, which disclose the preferred embodiment of the invention, and pointed out in the claim hereunto appended.

In the accompanying drawings:—

Figure 3 is a top plan view.

Figure 4 is an end elevation.

Figure 5 is a detail elevation showing the operative connections.

Figure 6 is a fragmentary plan view of the latch and keeper means for the operating parts.

Figure 7 is a part elevation and section, the sectional part being taken on the line 7—7 of Figure 6.

Figure 8 is an edge elevation of the keeper.

Figure 9 is a modified form of offset operating connections for the indicator adapting the same to variable makes of cars or automobiles.

Similar reference characters indicate corresponding parts throughout the several views in the drawings.

Figure 1:
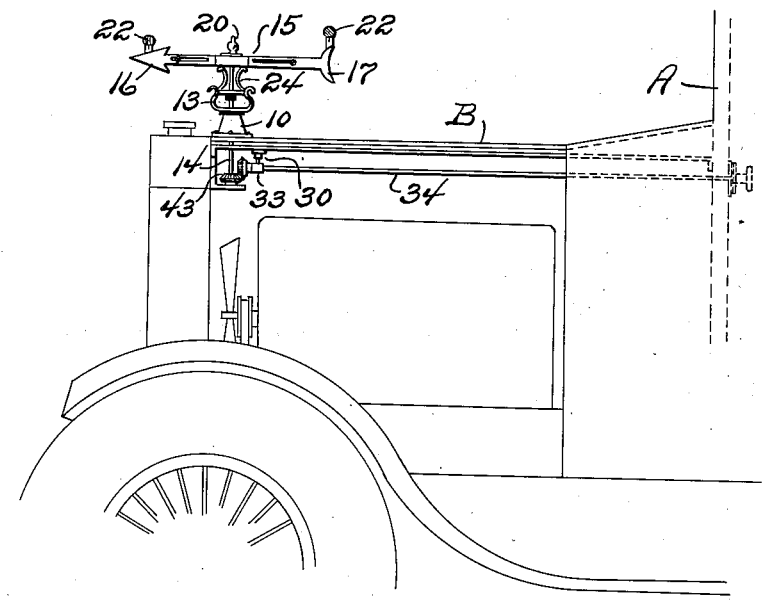
Figure 1 is a fragmentary side elevation of the motor driven vehicle showing the indicator or device constructed in accordance with the invention applied thereto and in normal position.
Figure 2:
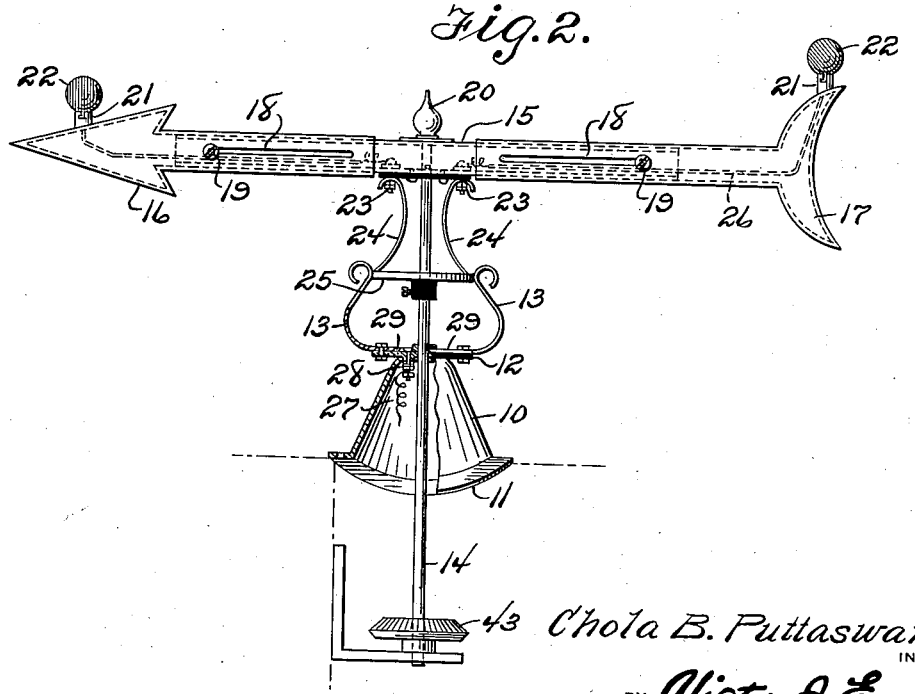
Figure 2 is a fragmentary vertical sectional view of the indicator or device with adjunct parts in association therewith.

Referring to the drawings in detail, A designates generally the fore part of an automobile on which the indicator or device is carried preferably at the high point of the hood B thereof, the indicator or device being hereinafter fully described.

The indicator or device comprises a truncated substantially conical-shaped base 10 having a lower attaching flange 11, the latter being shaped to the external shape of the hood B and is made fast thereto next to the radiator of the automobile in any suitable manner. Upon the truncated end of the base 10 is arranged an insulating block 12, to the outer ends of which is bolted a pair of opposed resilient contacting arms 13, while passed centrally upwardly through the base 10 is a turning staff or rod 14, the latter being loosely passed through the truncated end of said base and projects upwardly the required distance. Upon the upper end portion of the staff or stem 14 is a tubular crosshead 15 on the opposite ends of which are telescopically fitted an arrow head 16 of hollow formation and a tail part 17 of hollow formation, these being longitudinally slotted at 18 through each of which passes the set screw 19 adapted to be threaded into the crosshead so that in this manner the head 16 and the tail part 17 can be extended or contracted with relation to each other according to the fancy of the user of the indicator or device. The upper end of the staff or stem 14 carries an ornament or cap 20 of fanciful design.

Formed on the head and tail part 17 are electric light sockets 21 carrying electric light bulbs 22.

Suitably fastened to and insulated at 23 from the crosshead 15 are opposed outwardly curved brace arms 24, these joined with a disk 25 mounted upon the staff or stem 14 and with which latter engage the contacting arms 13 irrespective of the adjustment of the crosshead. The fasteners 23 for the braces 24 have electric current feed wires 26 connected therewith which lead to the sockets 21 and these with the braces 24, arms 13 and the wire 27 connected with the terminal 28 engaged with the cross connecting piece 29 of the arms 13 completes the circuit of the electric system in the car to the bulbs 22 for illumination thereof, it being understood of course, that the current return is grounded through the crosshead 15, staff or stem 14 and the frame of the car, the arms 13 being constantly engaged with the disk 25 when the indicator or device is operated.

Beneath the hood B is a hanger including a socket member 30 in which is adjustably engaged by a binding screw 31 the stem 32 of a sleeve bearing 33 in which is mounted an operating shaft 34, the same being extended through the dash or front board of the automobile in convenient reach of an operator thereof, the shaft being also journaled centrally in a keeper 35 having a notched rim 36 with opposite ones of which are adapted to engage a latching pin 37 mounted transversely of the shaft 34 and slidably in a suitable slot therein to permit the latching and releasing of said pin. This pin also engages the inner end of the socketed stem 38 of a pull knob 39, the shaft 34 being slidably fitted in said stem 38 and has the enlarged end 40 against which plays a coiled tensioning spring 41, the latter being also engaged with the cross pin 37, thus the knob 39 when pulled upon against the resistance of the spring 41 will permit the release of the pin 37 from the selected notches 36 in the keeper 35 and the turning shaft 34 for operating the indicator or device.

The shaft 34 at its forward end carries a beveled gear 42 meshing with a pinion 43 fixed to the staff or stem 14 so that on the rotation of the shaft 34 similar movement will be imparted to a staff or stem for the turning of the indicator or device to indicate the direction of turn of the automobile either at the time of starting thereof or while in motion. When the knob 39 is released the spring 41 becomes active to seat the pin 37 in registering notches 36 in the keeper 35 and thus latching the indicator or device in its adjusted position.

In Figure 9 there is shown a slight modification wherein the shaft 44 which corresponds with the shaft 34 carries a sprocket 45 having trained thereover an endless sprocket chain 46, the same being also trained over a sprocket 47 having gear connection with the staff or stem 48 corresponding to the staff or stem 14 and in this manner the operating medium for the indicator at the front board of the automobile body can be offset to suit the fancy of the user of the indicator or device so that the knob 39 will be out of alignment with the staff or stem 48 of said indicator or device.

It is to be understood of course that the sprockets 45 and 47 with the chain 46 trained thereover are located rearwardly of the front board of an automobile with the shaft 44 corresponding to the shaft 34 passing through this board and to which is fitted the knob 39 so that it is readily accessible and can be conveniently operated by the user of the automobile.

The electric bulb mounted at the head is preferably of red hue while the electric bulb at the tail part 17 is green.

It is understood of course that the indicator is specially adaptable for automobiles but at the same time is useable on other vehicles including boats, ships, and aeroplanes, etc.

It is believed that an understanding of the operation of the device or indicator will be had from the foregoing description when taken in connection with the accompanying drawings and therefore a more extended explanation has been omitted.

What is claimed is:—

A signal device of the character described, comprising a substantially conical-shaped base for mounting on an engine hood of an automobile, outwardly and inwardly curved spring arms rising from the base and fixed to and insulated therefrom, a rotary shaft journaled centrally of said base, an electric conductor disk fixed to the shaft and insulated therefrom for the contact of the spring arms peripherally therewith, braces on the disk at opposite sides of the shaft, a signal arm carried by the braces and shaft and insulated therefrom, a signal lamp on the arm, and an electric circuit for the lamp and including the spring arms, the disk and the braces and grounded through the shaft.

CHOLA B. PUTTASWAMY.